United States Patent
Kuzushima et al.

(10) Patent No.: US 11,211,604 B2
(45) Date of Patent: Dec. 28, 2021

(54) POSITIVE ELECTRODE ACTIVE MATERIAL FOR NON-AQUEOUS ELECTROLYTE SECONDARY BATTERY, POSITIVE ELECTRODE, AND SECONDARY BATTERY

(71) Applicant: ELIIY Power Co., Ltd., Tokyo (JP)

(72) Inventors: Yusuke Kuzushima, Tokyo (JP); Tomitaro Hara, Tokyo (JP)

(73) Assignee: ELIIY POWER CO., LTD., Tokyo (JP)

( * ) Notice: Subject to any disclaimer, the term of this patent is extended or adjusted under 35 U.S.C. 154(b) by 511 days.

(21) Appl. No.: 15/570,418

(22) PCT Filed: May 1, 2015

(86) PCT No.: PCT/JP2015/063138
§ 371 (c)(1),
(2) Date: Oct. 30, 2017

(87) PCT Pub. No.: WO2016/178280
PCT Pub. Date: Nov. 10, 2016

(65) Prior Publication Data
US 2018/0151880 A1   May 31, 2018

(51) Int. Cl.
*H01M 4/583* (2010.01)
*H01M 4/58* (2010.01)
*H01M 4/525* (2010.01)
*H01M 4/36* (2006.01)
(Continued)

(52) U.S. Cl.
CPC ............. *H01M 4/525* (2013.01); *H01M 4/13* (2013.01); *H01M 4/366* (2013.01); *H01M 4/583* (2013.01);
(Continued)

(58) Field of Classification Search
None
See application file for complete search history.

(56) References Cited

FOREIGN PATENT DOCUMENTS

| EP | 2675002 A1 | 12/2013 |
|---|---|---|
| EP | 2851978 A1 | 3/2015 |

(Continued)

OTHER PUBLICATIONS

English translation of Lee et al (KR 2013/0035495) (Year: 2013).*
(Continued)

*Primary Examiner* — Yoshitoshi Takeuchi
(74) *Attorney, Agent, or Firm* — Stites & Harbison, PLLC; Terry L. Wright; Jeffrey A. Haeberlin (57) ABSTRACT

A positive electrode active material for a non-aqueous electrolyte secondary battery according to the present invention is characterized by including positive electrode active material particles, and a carbonaceous coating film formed on the surface of the positive electrode active material particle and including a plurality of carbon hexagonal network planes, wherein the carbonaceous coating film is formed so that a Raman spectrum, in which a ratio $I_D/I_G$ between a peak intensity $I_D$ of the D band and a peak intensity $I_G$ of the G band is 0.9 or lower and the full width at half maximum of the peak of the G band is 80 cm$^{-1}$ or smaller, is measured.

3 Claims, 8 Drawing Sheets

(51) Int. Cl.
     *H01M 4/13*          (2010.01)
     *H01M 10/48*        (2006.01)
     *H01M 10/052*      (2010.01)
     *H01M 10/0525*     (2010.01)
     *H01M 4/02*          (2006.01)

(52) U.S. Cl.
     CPC ....... *H01M 4/5825* (2013.01); *H01M 10/488* (2013.01); *H01M 10/052* (2013.01); *H01M 10/0525* (2013.01); *H01M 2004/028* (2013.01)

(56) References Cited

FOREIGN PATENT DOCUMENTS

| | | | | |
|---|---|---|---|---|
| JP | 2000-223120 A | | 8/2000 | |
| JP | 2013/0035495 | * | 4/2013 | ............... B82B 3/00 |
| JP | 2015-065134 A | | 4/2015 | |
| KR | 2013-0035495 A | | 4/2013 | |

OTHER PUBLICATIONS

European Patent Office, Extended European Search Report (EESR) issued in corresponding European Patent Application No. 15891287 dated Aug. 24, 2018.
European Patent Office, Office Action issued in corresponding European Patent Application No. 15891287 dated Sep. 6, 2019.
Antunes, E.F., et al. "Comparative study of first-and second-order Raman spectra of MWCNT at visible and infrared laser excitation," Carbon, Elsevier, Oxford, GB, vol. 44, No. 11, Sep. 1, 2006 (Sep. 1, 2006), pp. 2202-2211. For relevance, see: EP OA.

* cited by examiner

POSITIVE ELECTRODE ACTIVE MATERIAL FOR NON-AQUEOUS ELECTROLYTE SECONDARY BATTERY, POSITIVE ELECTRODE, AND SECONDARY BATTERY

TECHNICAL FIELD

The present invention relates to a positive electrode active material for a non-aqueous electrolyte secondary battery, a positive electrode for a non-aqueous electrolyte secondary battery, and a non-aqueous secondary battery.

BACKGROUND ART

Non-aqueous electrolyte lithium secondary batteries such as lithium ion secondary batteries have recently been put into practical use as small lightweight batteries which have a large capacity and can be charged/discharged.

These batteries can be used as a power supply of an electronic device such as a mobile communication device or a notebook-sized personal computer which is rapidly becoming smaller, and besides, these batteries have been studied and developed as batteries for a large-capacity stationary power storage system in the midst of growing concerns about resource saving, energy saving, and energy efficiency for the purpose of internationally protecting a global environment which has recently been degraded. In addition, in the automobile industry, lithium ion secondary batteries have been studied and developed as batteries for driving motors for electric vehicles or hybrid electric vehicles for attaining effective utilization of energy.

Generally, a non-aqueous electrolyte solution prepared by dissolving a lithium salt into an organic solvent is used as an electrolyte solution in a lithium ion secondary battery.

Because the non-aqueous electrolyte solution is a combustible material, a conventional battery is also provided with a safety mechanism such as a safety valve or a separator.

Such a safety mechanism has a structure such that, when an abnormal state occurs such as heat generation from a battery due to overcharging, the safety valve is cleaved to release an increased internal pressure of the battery so as to prevent explosion of the battery.

Such a safety mechanism also has a structure such that, when an abnormal state occurs such as heat generation from a battery due to overcharging, pores formed on the separator are closed (shut down) to block a path for conductive ions in the battery for preventing the further progress of the reaction, when the battery reaches about 120° C.

Further, a positive electrode active material provided with a carbonaceous coating film coating the surface of olivine-type inorganic particles has been known (see, for example, Patent Document 1).

CITATION LIST

Patent Document

Patent Document 1: Japanese Unexamined Patent Publication No. 2015-65134

SUMMARY OF THE INVENTION

Problem to be Solved by the Invention

However, in the safety mechanism having the conventional structure, the electrolyte solution filled in the battery boils due to heat generated when the battery is overcharged, and thus, the safety valve of the battery is opened. When the safety valve is opened, the electrolyte solution in the battery is ejected all around from the battery, which may adversely affect peripheral devices.

Further, the method for thermally closing the path for conductive ions in the separator as the mechanism for stopping the abnormal state due to overcharging may restrict the type of separator materials. Besides, if the heat generation excessively progresses, a function for preventing a short circuit between positive and negative electrodes is impaired due to contraction of the entire separator, for example, which may prevent the function for stopping the abnormal state from properly working.

In the midst of growing demand for safety of a protection function during overcharging, a need of another safety mechanism has been increasing in addition to the protection mechanism such as a safety valve and a separator.

The present invention is accomplished in view of the above circumstances, and provides a novel positive electrode active material for a non-aqueous electrolyte secondary battery having a protection function against overcharging.

Means for Solving the Problems

The present invention provides a positive electrode active material for a non-aqueous electrolyte secondary battery, including positive electrode active material particles, and a carbonaceous coating film formed on the surface of the positive electrode active material particle and including a plurality of carbon hexagonal network planes, wherein the carbonaceous coating film is formed so that a Raman spectrum, in which a ratio $I_D/I_G$ between a peak intensity $I_D$ of the D band and a peak intensity $I_G$ of the G band is 0.9 or lower and the full width at half maximum of the peak of the G band is 80 cm$^{-1}$ or smaller, is measured.

Effect of the Invention

The positive electrode active material according to the present invention includes positive electrode active material particles. Therefore, the positive electrode active material can promote a battery reaction in the positive electrode on the surface of the positive electrode active material particles.

The positive electrode active material according to the present invention includes a carbonaceous coating film formed on the surface of the positive electrode active material particle and including a plurality of carbon hexagonal network planes. Therefore, the carbonaceous coating film has a high conductivity, whereby electrons involved with the battery reaction in the positive electrode can be conducted through the carbonaceous coating film. Accordingly, even if the positive electrode active material particles are substances having relatively a high electric resistance, the internal resistance of the positive electrode can be reduced.

The carbonaceous coating film included in the positive electrode active material according to the present invention is formed so that a Raman spectrum, in which a ratio $I_D/I_G$ between a peak intensity $I_D$ of the D band and a peak intensity $I_G$ of the G band is 0.9 or lower and the full width at half maximum of the peak of the G band is 80 cm$^{-1}$ or smaller, is measured. This allows the carbonaceous coating film to have grown carbon hexagonal network planes. Thus, when the non-aqueous electrolyte secondary battery is in an overcharged state, the resistance of the carbonaceous coating film can be increased, whereby an electric current flowing through the battery can be quickly reduced. This has been verified by experiments conducted by the present inventors.

It is not clear why the resistance of the carbonaceous coating film is increased in the overcharged state. However, it is considered that, due to the overcharging, the potential of the carbonaceous coating film is increased, which leads to alteration of the carbonaceous coating film. For example, it is considered that the carbon hexagonal network planes are oxidized.

If the resistance of the carbonaceous coating film can be increased when the battery is in the overcharged state, a charging current flowing through the battery in the overcharged state can quickly be reduced, whereby the heat generation of the battery can quickly be suppressed. Accordingly, an increase in the temperature of the battery can be suppressed. This results in suppressing the internal pressure of the battery from rising due to the overcharging, thereby being capable of preventing the explosion of the battery. Further, the heat generation of the battery in the overcharged state can be suppressed without using the shut-down function of the separator which has conventionally been used.

Specifically, when the positive electrode active material according to the present invention is used, a battery having an independent safety-improving mechanism different from the shut-down function of the separator can be manufactured.

In addition, when the battery is in the overcharged state, heat generated from the battery is reduced, whereby a battery in which a safety valve is not activated even when the battery is in the overcharged state can be manufactured.

Meanwhile, the peak of the G band (the peak near about 1590 cm$^{-1}$) is commonly observed for sp$^2$ carbons (carbon atoms having three bonds) and corresponds to the C-C stretching vibration of the carbon hexagonal network plane. The peak of the D band (the peak near about 1350 cm$^{-1}$) in the Raman spectrum indicates a structural defect of the carbon hexagonal network plane. The ratio $I_D/I_G$ of the Raman spectrum is considered to reflect the ratio between the network planes of the carbon hexagonal network planes and the edges of the carbon hexagonal network planes. It is also considered that the proportion of the network planes of the carbonaceous coating film is increased, as the ratio $I_D/I_G$ becomes smaller. Specifically, it is considered that the carbon hexagonal network planes are grown and the size of the carbon hexagonal network planes is increased, as the ratio $I_D/I_G$ becomes smaller. It is considered that, if the ratio $I_D/I_G$ is 0.9 or smaller, the carbon hexagonal network planes grow to some extent.

The full width at half maximum (FWHM) of the peak of the G band is considered to reflect the crystalline nature of the carbon hexagonal network plane. It is considered that, the smaller the full width at half maximum of the peak of the G band becomes, the higher the parallelism of the carbon hexagonal network planes becomes, which leads to an increase in the length of the carbon hexagonal network plane, and therefore, the structure of the carbonaceous coating film becomes close to a graphite structure. If the full width at half maximum (FWHM) of the peak of the G band is 80 cm$^{-1}$ or less, high parallelism of carbon hexagonal network planes and growth of the carbon hexagonal network planes to some extent can be expected.

BRIEF DESCRIPTION OF THE DRAWINGS

FIGS. 11(a) and (b) are TEM images of the positive electrode active material powders in Example 1.

FIGS. 12(a) and (b) are TEM images of the positive electrode active material powders in Comparative Example 1.

EMBODIMENTS OF THE INVENTION

The positive electrode active material for a non-aqueous electrolyte secondary battery according to the present invention is characterized by comprising positive electrode active material particles, and a carbonaceous coating film formed on the surface of the positive electrode active material particle and including a plurality of carbon hexagonal network planes, wherein the carbonaceous coating film is formed so that a Raman spectrum, in which a ratio $I_D/I_G$ between a peak intensity $I_D$ of the D band and a peak intensity $I_G$ of the G band is 0.9 or lower and the full width at half maximum of the peak of the G band is 80 cm$^{-1}$ or smaller, is measured.

In the positive electrode active material according to the present invention, it is preferable that the plurality of carbon hexagonal network planes is arranged such that network planes thereof face the surface of the positive electrode active material particles.

According to the configuration of the carbonaceous coating film described above, when the non-aqueous electrolyte secondary battery is in an overcharged state, the resistance of the carbonaceous coating film can be increased to enable quick reduction in an electric current flowing through the battery. This has been verified by experiments conducted by the present inventors.

It is preferable that, in the positive electrode active material according to the present invention, the carbonaceous coating film is provided such that the average length of the carbon hexagonal network planes included in a transmission electron microscope image of the carbonaceous coating film is 3 nm or more.

According to the configuration of the carbonaceous coating film described above, when the non-aqueous electrolyte secondary battery is in an overcharged state, the resistance of the carbonaceous coating film can be increased to enable quick reduction in an electric current flowing through the battery. This has been verified by experiments conducted by the present inventors.

It is preferable that, in the positive electrode active material according to the present invention, the positive electrode active material particles are olivine-type compound particles or NASICON-type compound particles.

According to this configuration, when the battery is in an overcharged state, the progression of a reaction of decomposing the positive electrode active material can be suppressed, which can prevent the battery from generating heat.

The present invention also provides a positive electrode for a non-aqueous electrolyte secondary battery provided with a positive electrode active material layer including the positive electrode active material according to the present invention.

According to the positive electrode of the present invention, the carbonaceous coating film on the positive electrode active material particles included in the positive electrode active material layer is allowed to have a performance for blocking the conduction when the battery is in an overcharged state. Thus, a more safety battery can be manufactured.

The present invention also provides a non-aqueous electrolyte secondary battery provided with the positive electrode according to the present invention, a negative electrode, a separator sandwiched between the positive electrode and the negative electrode, a non-aqueous electrolyte, and a battery case which stores the positive electrode, the negative electrode, the separator, and the non-aqueous electrolyte.

According to the non-aqueous electrolyte secondary battery in the present invention, when the battery is in an overcharged state, the internal resistance of the positive electrode can be increased, whereby a charging current flowing through the battery can be reduced. Thus, generation of heat from the battery in the overcharged state can be suppressed, which enables suppression of an increase in the internal pressure of the battery.

Hereinafter, an embodiment of the present invention will be described with reference to the drawings. Structures shown in the drawings or the following descriptions are just exemplifications and the scope of the present invention is not limited thereto.

Figure 1:
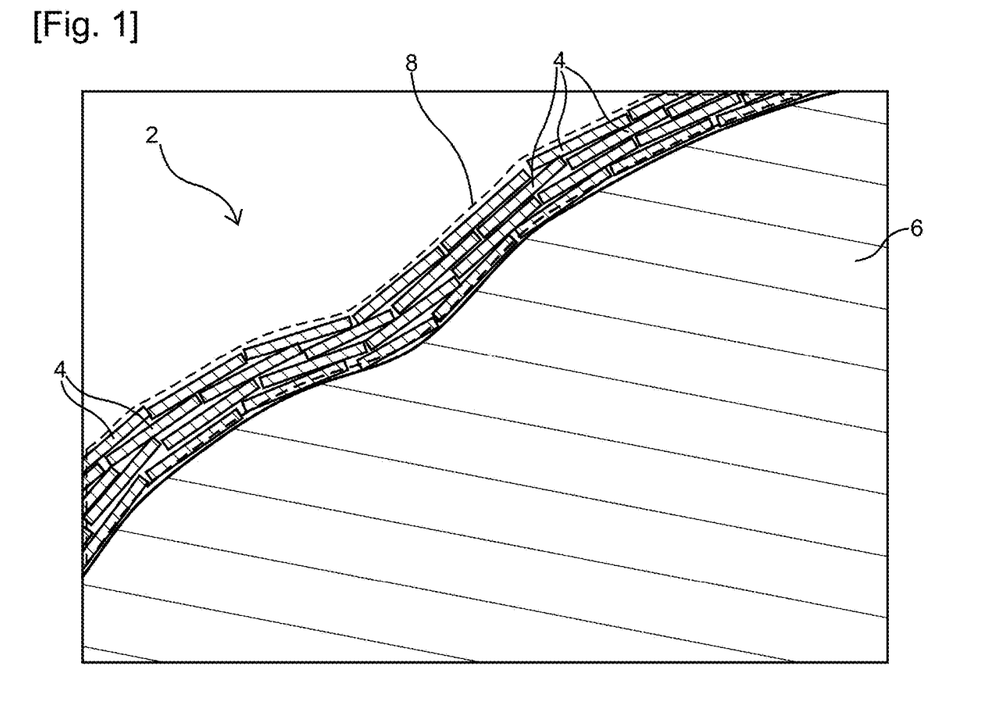
FIG. 1 is a schematic sectional view showing a portion of a positive electrode active material for a non-aqueous electrolyte secondary battery according to one embodiment of the present invention.
Figure 2:
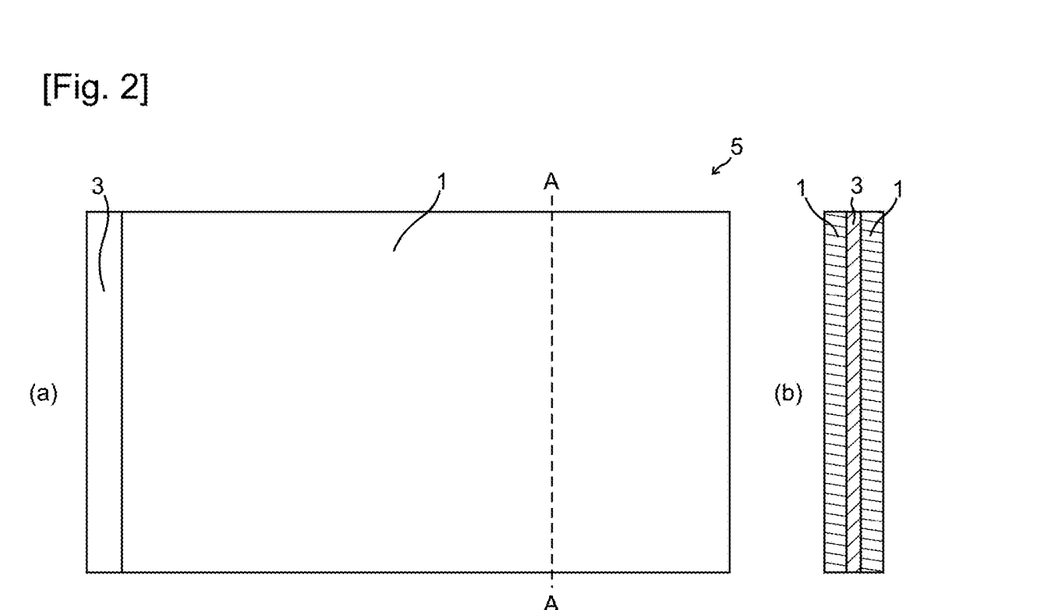
FIG. 2(a) is a schematic plan view of a positive electrode for a non-aqueous electrolyte secondary battery according to one embodiment of the present invention.
FIG. 2(b) is a schematic sectional view of the positive electrode taken along a broken line A-A in FIG. 2(a).
Figure 3:
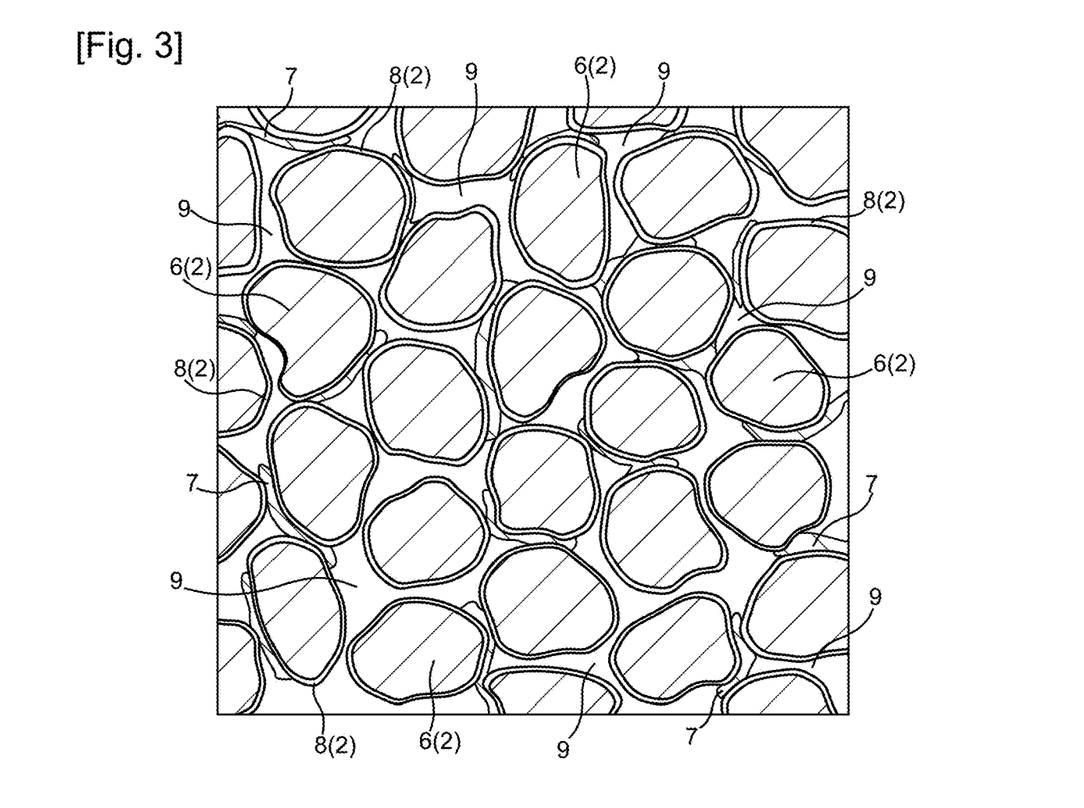
FIG. 3 is a schematic sectional view showing an internal structure of a positive electrode active material layer included in the positive electrode for a non-aqueous electrolyte secondary battery according to one embodiment of the present invention.
Figure 4:
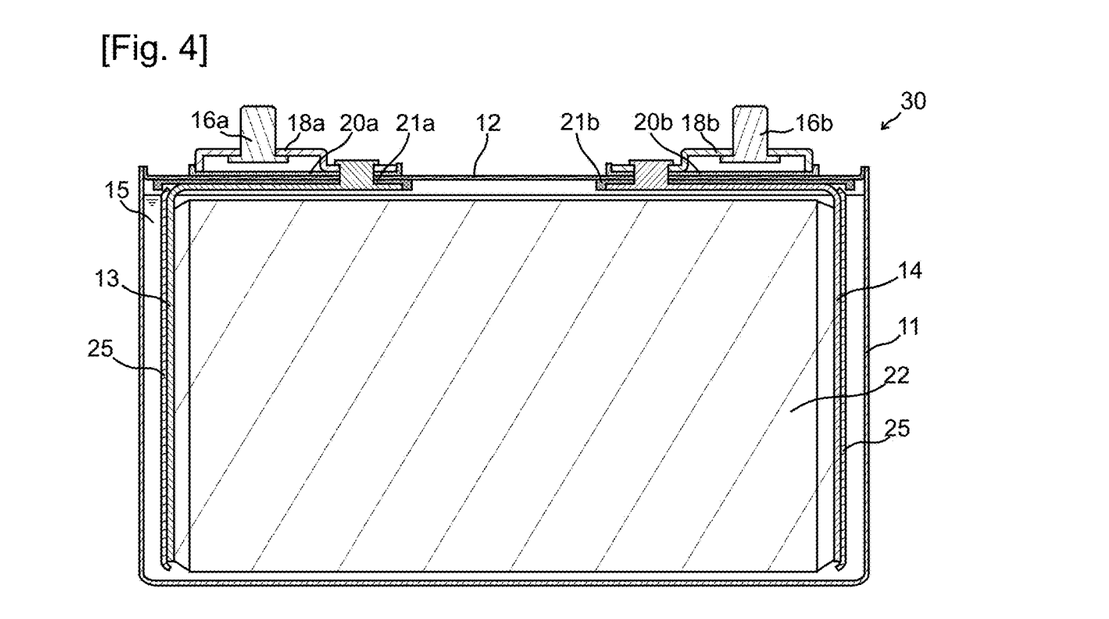
FIG. 4 is a schematic sectional view of a non-aqueous electrolyte secondary battery according to one embodiment of the present invention.
Figure 5:
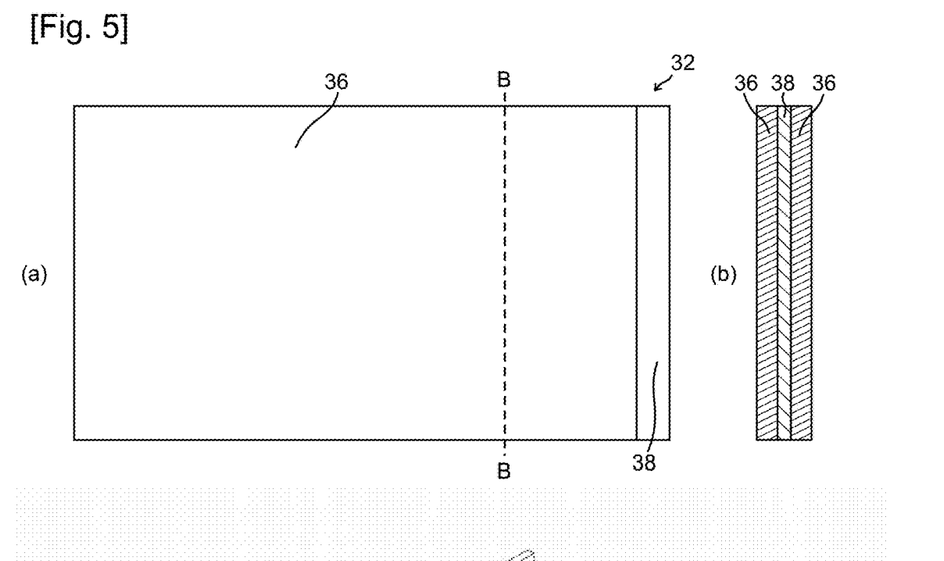
FIG. 5(a) is a schematic plan view of a negative electrode included in the non-aqueous electrolyte secondary battery according to one embodiment of the present invention.
FIG. 5(b) is a schematic sectional view of the negative electrode taken along a broken line B-B in FIG. 5(a).
Figure 6:
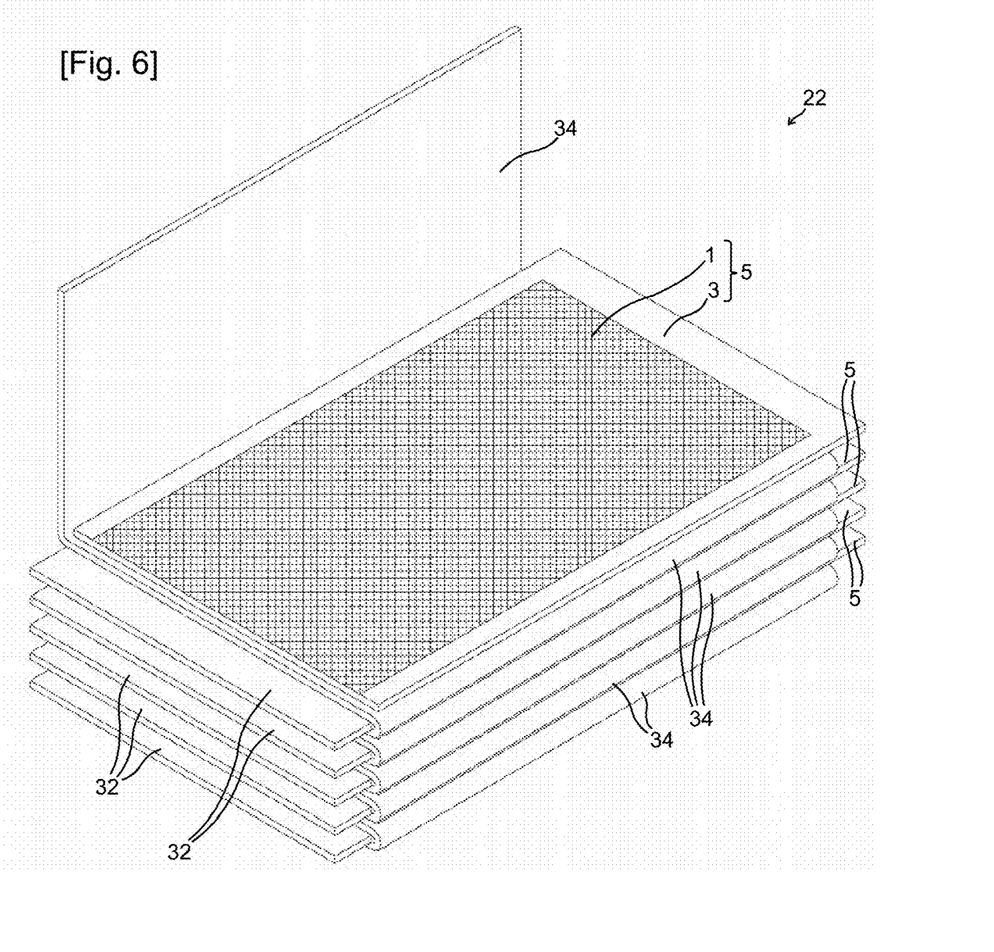
FIG. 6 is a schematic perspective view showing a configuration of a power generation element included in the non-aqueous electrolyte secondary battery according to one embodiment of the present invention.

FIG. 1 is a schematic sectional view showing a portion of a positive electrode active material for a non-aqueous electrolyte secondary battery according to the present embodiment. FIG. 2($a$) is a schematic plan view of a positive electrode for a non-aqueous electrolyte secondary battery according to the present embodiment, and FIG. 2($b$) is a schematic sectional view of the positive electrode taken along a broken line A-A in FIG. 2($a$). FIG. 3 is a schematic sectional view showing an internal structure of a positive electrode active material layer included in the positive electrode for a non-aqueous electrolyte secondary battery according to the present embodiment. FIG. 4 is a schematic sectional view of the non-aqueous electrolyte secondary battery according to the present embodiment. FIG. 5($a$) is a schematic plan view of a negative electrode included in the non-aqueous electrolyte secondary battery according to the present embodiment, and FIG. 5($b$) is a schematic sectional view of the negative electrode taken along a broken line B-B in FIG. 5($a$). FIG. 6 is a schematic perspective view showing a configuration of a power generation element included in the non-aqueous electrolyte secondary battery according to the present embodiment.

A positive electrode active material 2 for a non-aqueous electrolyte secondary battery according to the present embodiment is characterized by including positive electrode active material particles 6 and a carbonaceous coating film 8 formed on the surface of the positive electrode active material particle 6 and having a plurality of carbon hexagonal network planes 4, wherein the carbonaceous coating film 8 is formed so that a Raman spectrum, in which a ratio $I_D/I_G$ between a peak intensity $I_D$ of the D band and a peak intensity $I_G$ of the G band is 0.9 or lower and the full width at half maximum of the peak of the G band is 80 cm$^{-1}$ or smaller, is measured.

A positive electrode 5 for a non-aqueous electrolyte secondary battery according to the present embodiment is characterized by being provided with a positive electrode active material layer 1 including the above-mentioned positive electrode active material 2.

A non-aqueous electrolyte secondary battery 30 according to the present embodiment is characterized by including the above-mentioned positive electrode 5, a negative electrode 32, a separator 34 sandwiched between the positive electrode 5 and the negative electrode 32, a non-aqueous electrolyte 15, and a battery case 11 which stores the positive electrode 5, the negative electrode 32, the separator 34, and the non-aqueous electrolyte 15.

Hereinafter, the positive electrode active material 2, the positive electrode 5, and the non-aqueous electrolyte secondary battery 30 will be described.

1. Positive Electrode Active Material

The positive electrode active material 2 includes positive electrode active material particles 6 and the carbonaceous coating film 8 formed on the surface of the positive electrode active material particle 6 and including a plurality of carbon hexagonal network planes 4.

The positive electrode active material particles 6 can be formed to have an average particle diameter of 0.2 μm to 200 μm inclusive, preferably to have an average particle diameter of 0.2 μm to 100 μm inclusive. Note that the thickness of the carbonaceous coating film 8 is negligible because it is much smaller than the particle diameter of the positive electrode active material particle 6.

The positive electrode active material particles 6 may be particles of substances having an olivine-type crystal structure (olivine-type compounds). Examples of the olivine-type compounds include $LiFePO_4$, $Li_xM_yPO_4$ (wherein $0.05 \leq x \leq 1.2$ and $0 \leq y \leq 1$, and M is at least one or more elements selected from Fe, Mn, Cr, Co, Cu, Ni, V, Mo, Ti, Zn, Al, Ga, Mg, B, and Nb).

The positive electrode active material particles 6 may be particles of NASICON compounds which can be represented by $Y_xM_2(PO_4)_3$. The NASICON-type compound has a rhombohedral crystal, and examples of the NASICON-type compounds include $Li_{3+x}Fe_2(PO_4)_3$, $Li_{2+x}FeTi(PO_4)_3$, $Li_xTiNb(PO_4)_3$, and $Li_{1+x}FeNb(PO_4)_3$.

The positive electrode active material particles 6 may also be particles of lithium transition-metal composite oxides (layered type, spinel, etc.) that can reversibly extract and insert lithium ions.

In addition, the positive electrode active material 2 may include one kind of the above positive electrode active material particles 6 alone or may include two or more kinds of the above positive electrode active material particles 6.

The positive-electrode active material particles 6 may also be particles of a sodium transition-metal composite oxide. For example, the positive electrode active material particles 6 may be particles of an oxide represented by $Na_bM^2_cSi_{12}O_{30}$ (wherein $2 \leq b \leq 6$, $2 \leq c \leq 5$, and $M^2$ is one or more kinds of transition metal element,) such as $Na_dFe_2Si_{12}O_{30}$ or $Na_2Fe_5Si_{12}O_{30}$; particles of an oxide represented by $Na_dM^3_eSi_6O_{18}$ (wherein $3 \leq d=6$, $1 \leq e \leq 2$, and $M^3$ is one or more kinds of transition metal element,) such as $Na_2Fe_2Si_6O_{18}$ or $Na_2MnFeSi_6O_{18}$; particles of an oxide represented by $Na_fM^4_gSi_2O_6$ (wherein $1 \leq f \leq 2$, $1 \leq g \leq 2$, and $M^4$ is one or more elements selected from a transition metal element, Mg, and Al) such as $Na_2FeSiO_6$; particles of a phosphate such as $NaFePO_4$ or $Na_3Fe_2(PO_4)_3$; particles of a borate such as $NaFeBO_4$ or $Na_3Fe_2(BO_4)_3$; particles of a fluoride represented by $Na_hM^5F_6$ (wherein $2 \leq h \leq 3$ and $M^5$ is one or more transition metal elements,) such as $Na_3FeF_6$ or $Na_2MnF_6$.

In addition, the positive electrode active material 2 may include one kind of the above positive electrode active material particles 6 alone or may include two or more kinds of the above positive electrode active material particles 6.

The carbonaceous coating film 8 is formed on the surface of the positive electrode active material particles 6. The carbonaceous coating film 8 also includes a plurality of carbon hexagonal network planes 4. The thickness of the carbonaceous coating film 8 can be set to be 2 nm to 20 nm inclusive, for example.

The carbonaceous coating film 8 can be formed in such a manner that an organic compound coating layer is formed on the surface of the positive electrode active material particles 6, and this coating layer is subjected to a heat treatment under a non-oxidizing atmosphere and carbonized.

The carbon hexagonal network plane 4 is a carbon layer having a planar hexagonal network structure formed by $sp^2$ hybrid orbitals. Note that the thickness of the carbon hexagonal network plane 4 is about 0.335 nm. The size of the carbon hexagonal network plane 4 is a size of a network plane.

The carbon hexagonal network planes 4 included in the carbonaceous coating film 8 may have a laminated structure in which the carbon hexagonal network planes 4 are regularly laminated, a laminated structure in which the carbon hexagonal network planes 4 are irregularly laminated, or a structure in which the carbon hexagonal network planes 4 irregularly lie over one another.

The carbonaceous coating film 8 is formed so that a Raman spectrum, in which a ratio $I_D/I_G$ between a peak intensity $I_D$ of the D band and a peak intensity $I_G$ of the G band is 0.9 or lower, is measured. The carbonaceous coating film 8 is also formed so that a Raman spectrum, in which the full width at half maximum (FWHM) of the peak of the G band is 80 cm$^{-1}$ or smaller, is measured. According to this configuration, the carbonaceous coating film 8 can be formed to have grown carbon hexagonal network planes 4. Thus, when the non-aqueous electrolyte secondary battery 30 is in an overcharged state, the resistance of the carbonaceous coating film 8 can be increased to enable quick reduction in an electric current flowing through the battery. This has been verified by experiments conducted by the present inventors.

The peak intensity $I_D$ of the D band, the peak intensity $I_G$ of the G band, the ratio $I_D/I_G$, and the full width at half maximum of the peak of the G band can be obtained by measuring the Raman spectrum of the positive electrode active material 2 or the positive electrode active material layer 1, and subjecting the obtained Raman spectrum to a fitting process with a pseudo-voigt function.

The detail will be described later.

The carbonaceous coating film 8 can be formed such that the network planes of the carbon hexagonal network planes 4 constituting the carbonaceous coating film 8 face the surface of the positive electrode active material particles 6. Thus, when the non-aqueous electrolyte secondary battery 30 is in an overcharged state, the resistance of the carbonaceous coating film 8 can be increased to enable quick reduction in an electric current flowing through the battery. This has been verified by experiments conducted by the present inventors.

For example, as in the positive electrode active material 2 shown in FIG. 1, the carbonaceous coating film 8 can be formed to have a structure in which a plurality of carbon hexagonal network planes 4 arranged to face the surface of the positive electrode active material particles 6 lie over one another.

The carbonaceous coating film 8 can be formed such that the average size of the carbon hexagonal network planes 4 is 3 nm to 12 nm inclusive. According to this configuration, when the non-aqueous electrolyte secondary battery 30 is in an overcharged state, the resistance of the carbonaceous coating film 8 can be increased to enable quick reduction in an electric current flowing through the battery. This has been verified by experiments conducted by the present inventors.

Note that the size of the carbon hexagonal network plane 4 can be measured from a TEM image of the carbonaceous coating film 8.

2. Positive Electrode for Non-Aqueous Electrolyte Secondary Battery

The positive electrode 5 for a non-aqueous electrolyte secondary battery is used for the positive electrode constituting the non-aqueous electrolyte secondary battery 30 or for manufacturing the non-aqueous electrolyte secondary battery 30.

The positive electrode 5 for a non-aqueous electrolyte secondary battery is provided with the positive electrode active material layer 1 including the above-mentioned positive electrode active material 2. In addition, the positive electrode 5 may have a structure in which the positive electrode active material layer 1 is formed on a positive electrode current collector 3.

The positive electrode active material layer 1 includes the above-mentioned positive electrode active material 2 and a binder. The positive electrode active material layer 1 may also include a conductive auxiliary agent 7.

As the conductive auxiliary agent 7 included in the positive electrode active material layer 1, acetylene black, furnace black and carbon black can be used. The inclusion of the conductive auxiliary agent 7 in the positive electrode active material layer 1 enables efficient collection of electrons generated by an electrode reaction.

Examples of the binder included in the positive electrode active material layer 1 include polyvinylidene fluoride (PVdF), polytetrafluoroethylene (PTFE), styrene-butadiene copolymer (SBR), acrylonitrile rubber, and mixture of acrylonitrile rubber and PTFE. The inclusion of the binder in the positive electrode active material layer 1 can prevent the porous structure of the positive electrode active material layer 1 from collapsing.

The positive electrode active material layer 1 can be formed in such a way that, for example, a positive electrode active material paste is prepared by adding a solvent to positive electrode active material powders, the conductive auxiliary agent 7, and the binder, and the prepared paste is applied onto the positive electrode current collector 3. Examples of the solvent used to prepare the paste include dimethylformamide, N-methylpyrrolidone, isopropanol, and toluene.

The positive electrode active material layer 1 may have a layered structure, and may be formed to have substantially a certain thickness. The thickness of the positive electrode active material layer 1 can be set to be from 1 μm to 300 μm inclusive.

In addition, the positive electrode active material layer 1 can be formed on a sheet-type positive electrode current collector 3. The positive electrode active material layer 1 may be formed on both main surfaces of the sheet-type positive electrode current collector 3, or may be formed on one of the main surfaces of the sheet-type positive electrode current collector 3. For example, the positive electrode active material layer 1 can be formed on both main surfaces of the positive electrode current collector 3 as in the positive electrode 5 shown in FIGS. 2(*a*) and 2(*b*).

The positive electrode active material layer 1 has a porous structure, and has pores 9 inside. Thus, the pores 9 in the positive electrode active material layer 1 can be filled with a non-aqueous electrolyte 15, which can promote the electrode reaction in the pores 9. Accordingly, the surface area of the positive electrode active material layer 1 on which the electrode reaction progresses can be increased, and therefore, battery characteristics can be enhanced. The positive electrode active material layer 1 can be configured to have the porous structure as shown in the schematic sectional view of FIG. 3, for example.

The positive electrode current collector 3 is a member that collects electrons generated by the electrode reaction in the positive electrode active material layer 1. The positive electrode current collector 3 may have a sheet shape, for example. Further, the positive electrode current collector 3 may be a metal foil or an aluminum foil. When the positive electrode 5 includes the positive electrode current collector 3, the internal resistance of the battery can be reduced.

The positive electrode current collector 3 may have a portion where the positive electrode active material layer 1 is not formed on the surface thereof. Also, the positive electrode current collector 3 can be connected to a positive electrode connection member 13 on this portion. The portion of the positive electrode current collector 3 connected to the positive electrode connection member 13 can be formed as in the positive electrode 5 shown in FIG. 2(*a*). Note that the positive electrode connection member 13 can be electrically connected to an external connection terminal 18*a* of the positive electrode as in the non-aqueous electrolyte secondary battery 30 shown in FIG. 4.

3. Non-Aqueous Electrolyte Secondary Battery

The non-aqueous electrolyte secondary battery 30 is provided with the above-mentioned positive electrode 5, the negative electrode 32, the separator 34 sandwiched between the positive electrode 5 and the negative electrode 32, the non-aqueous electrolyte 15, and the battery case 11 which stores the positive electrode 5, the negative electrode 32, the separator 34, and the non-aqueous electrolyte 15.

The nonaqueous electrolyte secondary battery 30 is a battery including the positive electrode, the negative electrode, and the nonaqueous electrolyte. The nonaqueous electrolyte secondary battery 30 is a lithium ion secondary battery, a sodium ion secondary battery, or the like, for example.

The nonaqueous electrolyte secondary battery 30 is provided with the positive electrode 5 for a nonaqueous electrolyte secondary battery. Since the positive electrode 5 for a nonaqueous electrolyte secondary battery has been described above, the description thereof will be omitted. Note that the positive electrode 5 can compose the power generation element 22 shown in FIG. 6 together with the negative electrode 32 and the separator 34.

The negative electrode 32 includes a porous negative electrode active material layer 36 containing a negative electrode active material. The negative electrode 32 also includes a negative electrode current collector 38.

The negative electrode active material layer 36 can contain a negative electrode active material, a conductive agent, a binder, and the like.

Examples of the negative electrode active material include graphite, partially graphitized carbon, hard carbon, soft carbon, $LiTiO_4$, Sn, and Si. The negative electrode active material layer 36 may contain one kind of the above negative electrode active materials alone or may contain two or more kinds of the above negative electrode active materials.

The negative electrode active material layer 36 can be formed on the sheet-type negative electrode current collector 38. The negative electrode active material layer 36 may be formed on both main surfaces of the sheet-type negative electrode current collector 38, or may be formed on one of the main surfaces of the sheet-type negative electrode current collector 38. The negative electrode active material layer 38 can be formed on both main surfaces of the negative electrode current collector 38 as in the negative electrode 32 shown in FIGS. 5(*a*) and 5(*b*). In addition, the negative electrode 32 can compose the power generation element 22 shown in FIG. 6 together with the positive electrode 5 and the separator 34.

Note that the negative electrode active material layer 36 can be formed in such a way that, for example, a negative electrode active material paste is prepared by adding a solvent to negative electrode active material powders, a conductive agent, and a binder, and the prepared paste is applied onto the negative electrode current collector 38.

The negative electrode current collector 38 is a member that collects electrons generated by the electrode reaction in the negative electrode active material layer 36. The negative electrode current collector 38 may have a sheet shape, for example. Further, the negative electrode current collector 38 may be a metal foil or a copper foil. In addition, the negative electrode current collector 38 can be electrically connected to an external connection terminal 18*b* of the negative electrode.

The separator 34 has a sheet shape, and is interposed between the positive electrode 5 and the negative electrode 32. In addition, the separator 34 can compose the power generation element 22 shown in FIG. 6 together with the positive electrode 5 and the negative electrode 32. The formation of the separator 34 can prevent a short-circuit current from flowing between the positive electrode 5 and the negative electrode 32.

The separator 34 is not particularly limited, so long as it can prevent a short-circuit current from flowing and transmit ions that are conducted between the positive electrode and the negative electrode. For example, a microporous polyolefin film can be used.

The separator 34 may be provided with a shut-down mechanism that melts the separator 34 at a certain temperature to close (shut down) the pores to block the path for the conductive ions between the positive electrode and the negative electrode. This configuration can prevent the nonaqueous electrolyte secondary battery 30 from abnormally generating heat.

The power generation element 22 can be configured such that the positive electrode 5 and the negative electrode 32 are alternately disposed in valley folds of the separator 34 folded in zigzag, as in the power generation element 22 shown in FIG. 6.

The battery case 11 is a container which stores the positive electrode 5, the negative electrode 32, the separator 34, and the nonaqueous electrolyte 15. The material of the battery case 11 may be a hard material or a soft material. Specific examples of the material of the battery case 11 include a metal material such as aluminum, aluminum alloy, iron, iron alloy, or stainless, a rigid plastic, and a laminated film pouch. The material of the battery case 11 may be a metal material plated by nickel, tin, chromium, or zinc, for example.

The battery case 11 may have an opening closed by a lid member 12. According to this configuration, the power generation element 22 can be stored in the battery case 11.

In addition, the battery case 11 or the lid member 12 may be provided with a safety valve that is opened when the internal pressure of the battery rises. Thus, when the battery is in an abnormal condition due to abnormal heat generation by overcharge or the like, the safety valve cleaves to release the increased internal pressure of the battery, so that the explosion of the battery can be prevented.

The nonaqueous electrolyte 15 is stored in the battery case 11 to serve as an ion conduction medium between the positive electrode and the negative electrode. In addition, the nonaqueous electrolyte 15 includes a nonaqueous solvent, and an electrolyte salt dissolved in the nonaqueous solvent. Note that the nonaqueous electrolyte 15 may be liquid or gel.

In addition, the nonaqueous electrolyte 15 may be an electrolyte that forms a resistance coating film in the positive electrode active material layer by the charging current when the battery is overcharged. Further, the resistance coating film may be a film that interferes with the progress of the battery reaction. Moreover, the resistance coating film may have insulating property.

Examples of the usable nonaqueous solvent contained in the nonaqueous electrolyte 15 include a carbonate compound (cyclic carbonate compound, chain carbonate compound, etc.), lactone, ether, and ester. Two or more kinds of these solvents can be used as a mixture. Among these, especially a solvent prepared by mixing a cyclic carbonate compound and a chain carbonate compound is preferable.

Examples of the electrolyte salt contained in the nonaqueous electrolyte 15 include $LiCF_3SO_3$, $LiAsF_6$, $LiClO_4$, $LiBF_4$, $LiPF_6$, LiBOB, $LiN(CF_3SO_2)_2$, and $LiN(C_2F_5SO_2)$.

In addition, the nonaqueous electrolyte 15 may contain an additive agent such as VC (vinylene carbonate), PS (propane sultone), VEC (vinyl ethyl carbonate), PRS (propene sultone), fluorinated chain or cyclic carbonate (for example, at least one H on 4- and 5-position of ethylene carbonate is substituted with F or alkyl fluoride), or a flame retardant. The nonaqueous electrolyte 15 may contain one kind of these additive agents alone or two or more kinds as a mixture.

Formation of Carbonaceous Coating Film on Positive Electrode Active Material

Four types of positive electrode active material powders in Examples 1 and 2 and Comparative Examples 1 and 2 were prepared by forming the carbonaceous coating film 8 on the surface of lithium iron phosphate ($LiFePO_4$) powders using different carbon precursors. Specifically, these powders were prepared as described below.

1. Preparation of Positive Electrode Active Material Powders in Example 1

(1) Pretreatment of Positive Electrode Active Material

Lithium iron phosphate reagent (manufactured by Toyoshima Manufacturing Co., Ltd.) used as a raw material of the positive electrode active material was heated and dried for 5 hours at 350° C. under a nitrogen atmosphere to remove adsorbed water on the surface thereof.

(2) Preparation of Carbon Precursor Solution

An ethylene tar pitch (carbon precursor) was diluted with acetone to prepare a carbon precursor solution containing 20 wt. % of ethylene tar pitch.

(3) Process for Causing Carbon Precursor to Adhere to Positive Electrode Active Material 480 g of the pretreated positive electrode active material was added to 100 g of the carbon precursor solution, and the resultant was subjected to a mixing process for 1 hour at 20 rpm by a planetary mixer (HIVIS MIX Model 2P-03 manufactured by PRIMIX Corporation) in a dry box under a dew-point control. Thereafter, the resultant was heated to 40° C. in an oven, which was able to remove a solvent, to remove acetone which was a dilution solvent. Thus, a mixture containing carbon in an amount of 4 wt. % was prepared.

(4) Carbonizing Process

The mixture was subjected to a carbonizing process for 2 hours at 700° C. in a nitrogen atmosphere in an electric furnace (Model KBF-314N1 manufactured by Koyo Thermo Systems Co., Ltd.), whereby the positive electrode active material powders in Example 1 were prepared.

2. Preparation of Positive Electrode Active Material Powders in Example 2

A modified ethylene tar pitch (carbon precursor) not containing a quinoline insoluble was diluted with acetone to prepare a carbon precursor solution containing 20 wt. % of modified ethylene tar pitch. The positive electrode active material powders in Example 2 were prepared by using the obtained carbon precursor solution in the same manner as in Example 1.

3. Preparation of Positive Electrode Active Material Powders in Comparative Example 1

A pyrene (carbon precursor) was diluted with acetone to prepare a carbon precursor solution containing 20 wt. % of pyrene. The positive electrode active material powders in Comparative Example 1 were prepared by using the obtained carbon precursor solution in the same manner as in Example 1.

4. Preparation of Positive Electrode Active Material Powders in Comparative Example 2

A sucrose (carbon precursor) was diluted with acetone to prepare a carbon precursor solution containing 20 wt. % of sucrose. The positive electrode active material powders in Comparative Example 2 were prepared by using the obtained carbon precursor solution in the same manner as in Example 1.

Manufacture of Lithium Ion Secondary Battery

A positive electrode 1 was manufactured by using the positive electrode active material powders in Example 1, a positive electrode 2 was manufactured by using the positive electrode active material powders in Example 2, a positive electrode 3 was manufactured by using the positive electrode active material powders in Comparative Example 1, and a positive electrode 4 was manufactured by using the positive electrode active material powders in Comparative Example 2. The positive electrodes 1 to 4 have the same configuration except for positive electrode active material powders. Specifically, these electrodes were manufactured as follows.

Firstly, the positive electrode active material powders in Example 1, Example 2, Comparative Example 1, or Comparative Example 2, acetylene black (conductive auxiliary agent), and polyvinylidene fluoride (PVDF (($CH_2CF_2$)$_n$)) (binder) were mixed to have 88 to 95 wt. % of the positive electrode active material powders and 3.5 to 4.5 wt. % of the conductive auxiliary agent with respect to the total of 100 wt. %. N-methylpyrrolidone (NMP) was added to this mixture powders and the resultant was kneaded to prepare a positive electrode active material paste.

This positive electrode active material paste was applied onto an aluminum foil (current collector), and a coating film was dried to form a positive electrode active material layer on the current collector. Thus, four positive electrodes 1 to 4 were manufactured.

Next, a lithium ion secondary battery in Example 1 was manufactured by using the positive electrode 1 (using the positive electrode active material powders in Example 1), a lithium ion secondary battery in Example 2 was manufactured by using the positive electrode 2 (using the positive electrode active material powders in Example 2), a lithium ion secondary battery in Comparative Example 1 was manufactured by using the positive electrode 3 (using the positive electrode active material powders in Comparative Example 1), and a lithium ion secondary battery in Comparative Example 2 was manufactured by using the positive electrode 4 (using the positive electrode active material powders in Comparative Example 2). These lithium ion secondary batteries were manufactured to have the same configuration except for positive electrodes. Specifically, these batteries were manufactured as follows.

A power generation element formed by stacking the positive electrode 1, the positive electrode 2, the positive electrode 3, or the positive electrode 4, a separator formed from polyolefin (shut-down temperature: around 120° C.), and a carbonaceous negative electrode was placed in a battery case provided with a safety valve on a lid member, and a nonaqueous electrolyte solution was injected into the battery case. Thus, the lithium ion secondary batteries in Example 1, Example 2, Comparative Example 1, and Comparative Example 2 were manufactured. As the nonaqueous electrolyte solution, 1 M of $LiPF_6$ electrolyte solution containing carbonate solvent (EC:DEC:EMC=1:1:1), additives (1 part by weight of VC and 1 part by weight of FEC with respect to 100 parts by weight of the electrolyte solution), and $LiPF_6$ as an electrolyte was used.

Overcharge Test

The manufactured lithium ion secondary batteries in Example 1, Example 2, Comparative Example 1, and Comparative Example 2 were subjected to an overcharge test. Specifically, the overcharge test was conducted as described below.

Firstly, each battery was fully charged for 6 hours with a charging current being set as 50 A and an upper-limit voltage being set as 3.5 V. After each battery was fully charged, the overcharge test was conducted. In the overcharge test, CCCV (Constant-Current-Constant-Voltage) charging was conducted with the charging current being set as 50 A which was 1 ItA (1 CA) and the upper-limit voltage in the test being set as 10 V. In the overcharge test, a voltage between an external connection terminal of the positive electrode and an external connection terminal of the negative electrode and a current flowing between these external connection terminals were measured. In addition, in the overcharge test, a temperature was measured by a thermocouple mounted to the battery case.

Table 1 shows the result of the test.

TABLE 1

| | Safety valve after overcharging | Temperature rise during overcharging | Maximum temperature during overcharging |
| --- | --- | --- | --- |
| Example 1 | Closed | 32.8° C. | 60.7° C. |
| Example 2 | Closed | 39.2° C. | 66.9° C. |
| Comparative Example 1 | Opened | 91.9° C. | 112.9° C. |
| Comparative Example 2 | Opened | 83.8° C. | 113.2° C. |

Figure 7:
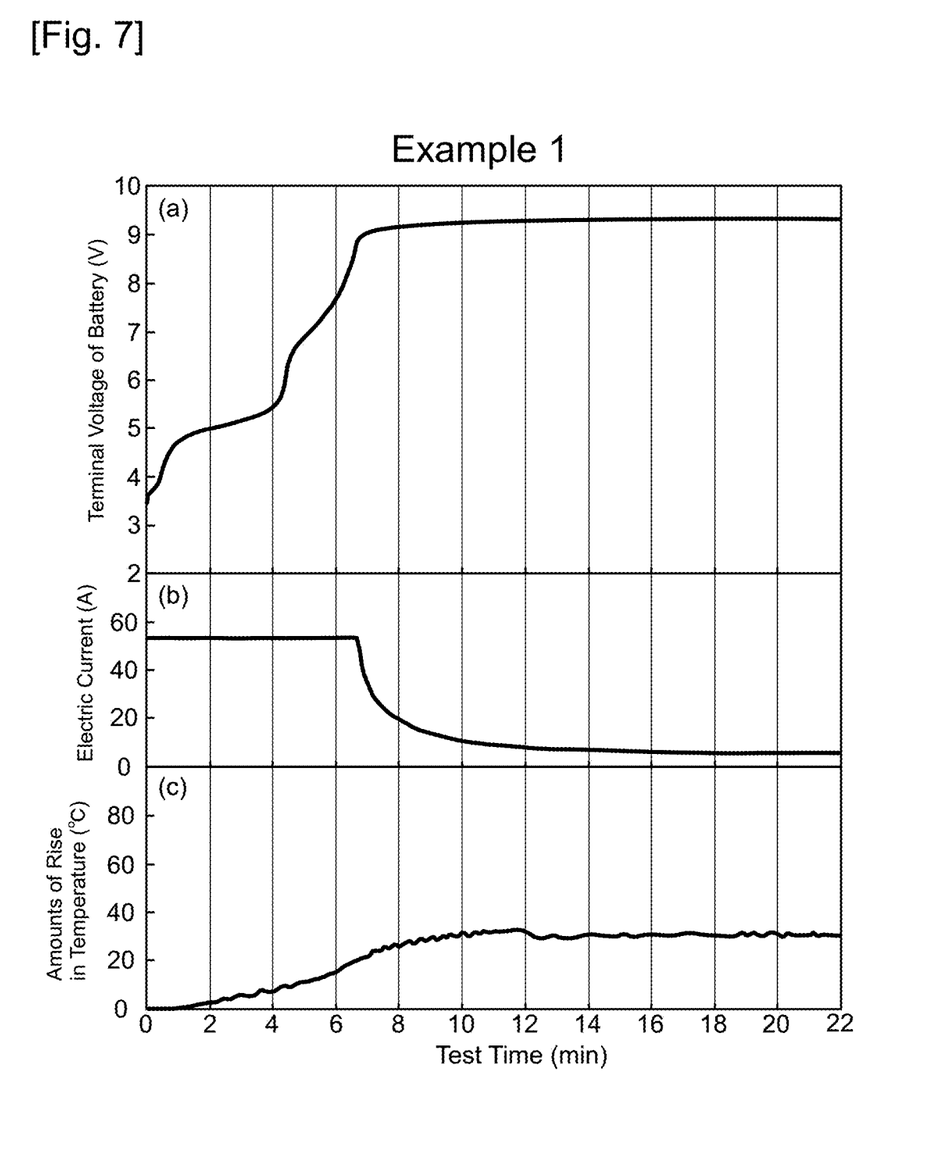
FIGS. 7(a) to (c) are graphs showing a result of an overcharge test for a battery in Example 1.
Figure 8:
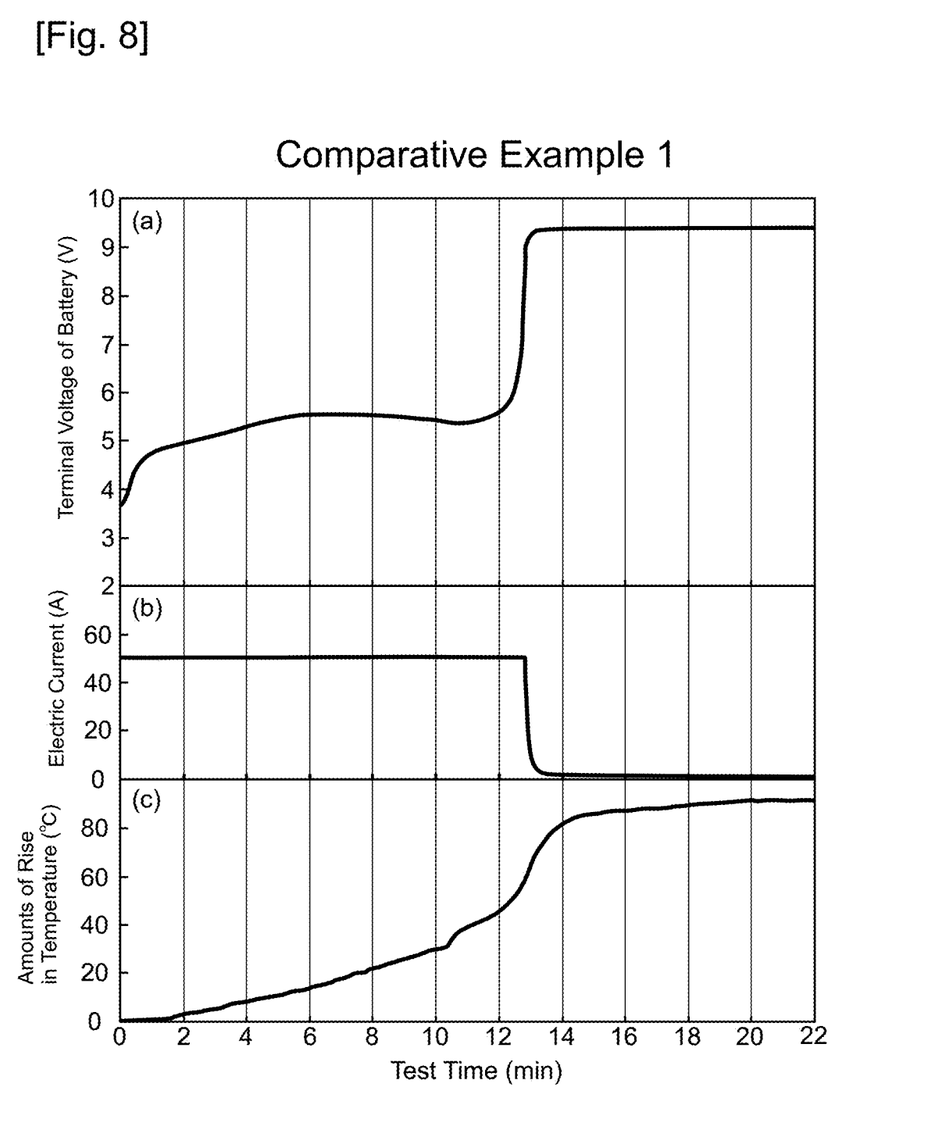
FIGS. 8(a) to (c) are graphs showing a result of an overcharge test for a battery in Comparative Example 2.

FIG. 7 shows the result of the overcharge test for the battery in Example 1, and FIG. 8 shows the result of the overcharge test for the battery in Comparative Example 1. Note that the horizontal axis in FIGS. 7 and 8 indicates a test time with the point of starting the overcharge test being defined as 0 minute. Further, FIGS. 7(c) and 8(c) show amounts of rise in temperature from the start of the overcharge test.

When the battery in Comparative Example 1 was continuously charged in an overcharged state, the voltage between the positive electrode and the negative electrode rose to about 5.5 V, and then, became almost constant, as indicated by a voltage curve in FIG. 8(a). Then, the voltage rapidly rose at about 12 minutes, and the voltage between the positive electrode and the negative electrode reached the test upper-limit voltage at around 13 minutes.

Further, in the battery in Comparative Example 1, an electric current between the positive electrode and the negative electrode rapidly dropped and hardly flew at around 13 minutes as indicated by a current curve in FIG. 8(b).

Moreover, in the battery in Comparative Example 1, the amount of rise in temperature of the battery case reached about 90° C. as shown in FIG. 8(c). Note that, in the battery in Comparative Example 1, the safety valve was opened and the electrolyte in the battery case was ejected.

It is considered that, in the battery in Comparative Example 1, the temperature in the battery reached 120° C. or higher, so that the pores in the separator were shut down to block the path for conductive ions in the battery, because the voltage between the positive electrode and the negative electrode rapidly rose and the electric current rapidly dropped at 12 to 13 minutes.

The overcharge test for the battery in Comparative Example 2 also exhibited a voltage behavior, current behavior, and temperature behavior which were similar to those in the overcharge test for the battery in Comparative Example 1.

When the battery in Example 1 was continuously charged in an overcharged state, the voltage between the positive electrode and the negative electrode gradually rose and reached the test upper-limit voltage at around 7 to 10 minutes of the test time as indicated by a voltage curve in FIG. 7(a). This shows that the battery in Example 1 has a more gradual voltage rise than the battery in Comparative Example 1.

Further, in the battery in Example 1, when the voltage between the positive electrode and the negative electrode reached the test upper-limit voltage at around 7 to 10 minutes, the current flowing between the positive electrode and the negative electrode gradually dropped, and hardly flew at 12 to 14 minutes of the test time as indicated by a current curve in FIG. 7(b). The battery in Example 1 exhibited a behavior different from the behavior in which the current suddenly stops flowing as is observed in the case where the pores in the separator are shut down.

Moreover, in the battery in Example 1, the battery temperature gradually rose until 10 to 12 minutes, and after that, became almost constant, as indicated by a curve of an amount of rise in temperature shown in FIG. 7(c). The amount of rise in temperature of the battery in Example 1 was about 30° C., and it is considered that the internal temperature of the battery did not reach the temperature at which the pores in the separator were shut down. It is to be noted that the safety valve was not opened in the battery in Example 1.

It is considered in the battery in Example 1 that, because the voltage between the positive electrode and the negative electrode gradually rose and the current flowing between the positive electrode and the negative electrode gradually dropped, the internal resistance of the battery gradually increased when the battery was in an overcharged state.

The overcharge test for the battery in Example 2 also exhibited a voltage behavior, current behavior, and temperature behavior which were similar to those in the overcharge test for the battery in Example 1.

Battery Disassembling Experiment after Overcharge Test

The positive electrodes were removed from the battery in Example 1 and the battery in Comparative Example 1 after the overcharge test, and the electric resistivity of these positive electrodes was measured by using a four-terminal method. The electric resistivity of the positive electrodes before being incorporated into the batteries was also measured.

In addition, the separators removed from the battery in Example 1 and the battery in Comparative Example 1 after the overcharge test, and were subjected to an air resistance test. The separators before being incorporated into the batteries were also subjected to the air resistance test. The air resistance test was conducted by using an air resistance tester (Gurley tester). In this test, a time required for permeation of air having a specified volume per a unit area is measured.

Table 2 shows the results of the test.

TABLE 2

| | Electric resistivity of positive electrode in Example 1 | Electric resistivity of positive electrode in Comparative Example 1 | Air permeance of separator of battery in Example 1 | Air permeance of separator of battery in Comparative Example 1 |
| --- | --- | --- | --- | --- |
| Before being incorporated into battery | 0.21 Ω·m | 0.15 Ω·m | 440 sec/100 ml | 440 sec/100 ml |
| After overcharge test | 527 Ω·m | 8.9 Ω·m | 570 sec/100 ml | 10000 sec/100 ml or more (unmeasurable) |

It is found from the result shown in Table 2 that the resistivity of the positive electrode in Example 1 after the overcharge test was 500 Ω·m or more which was significantly higher than the resistivity before the positive electrode was incorporated into the battery. On the other hand, the resistivity of the positive electrode in Comparative Example 1 after the overcharge test was about 9 Ω·m, which indicates that the amount of rise in the resistivity of the positive electrode was small.

It is understood from the above that the rise in the internal resistance of the battery in Example 1 after the overcharge test was attributed to the rise in the internal resistance of the positive electrode.

On the other hand, it is understood that the rise in the internal resistance of the battery in Comparative Example 1 after the overcharge test was not attributed to the rise in the internal resistance of the positive electrode.

Further, the result in Table 2 shows that the air resistance of the separator of the battery in Example 1 after the overcharge test was about 1.3 times the air resistance of the unused separator. On the other hand, the air resistance of the separator removed from the battery in Comparative Example 1 after the overcharge test was too large to be measured.

It is understood from the above that, in the overcharge test for the battery in Example 1, the internal temperature of the battery did not reach the shut-down temperature of the separator. In addition, the rise in the internal resistance of the battery in the overcharge test was not attributed to the pores in the separator being closed.

It is also understood that, in the overcharge test for the battery in Comparative Example 1, the internal temperature of the battery reached the shut-down temperature of the separator. Thus, it is considered that the pores in the separator were closed to block the path for conductive ions in the battery, which led to a rapid increase in the voltage between the positive electrode and the negative electrode and a rapid decrease in the current.

The positive electrode and the separator were removed from the battery in Example 2 after the overcharge test, and the measurement of the electric resistivity of the positive electrode and the air resistance test of the separator were conducted. The result of the air resistance test for the battery in Example 2 shows that the pores in the separator were not shut down as in the battery in Example 1. Further, the result of the measurement of the electric resistivity of the positive electrode of the battery in Example 2 shows that the electric resistivity of the positive electrode was increased as in the battery in Example 1. It is considered from the above that the phenomenon similar to the phenomenon in the battery in Example 1 also occurred in the battery in Example 2.

Also, the positive electrode and the separator were removed from the battery in Comparative Example 2 after the overcharge test, and the measurement of the electric resistivity of the positive electrode and the air resistance test of the separator were conducted. The result of the air resistance test for the battery in Comparative Example 2 shows that the pores in the separator were shut down as in the battery in Comparative Example 1. It is considered from the above that the phenomenon similar to the phenomenon in the battery in Comparative Example 1 also occurred in the battery in Comparative Example 2.

Raman Spectrum Measurement

The Raman spectra of the prepared positive electrode active material powders in Example 1, Example 2, Comparative Example 1, and Comparative Example 2 were measured by using a Raman spectrometer (T64000 manufactured by Horiba Ltd.). The Raman spectra obtained through this measurement were subjected to a fitting process with pseudo-voigt function to calculate a peak intensity $I_D$ of the D band, a peak intensity $I_G$ of the G band, a ratio $I_D/I_G$, and a full width at half maximum of the peak of the G band.

Table 3 shows the result of the calculation. In addition, FIG. 9 shows the result of the fitting process for the Raman spectrum of the positive electrode active material powders in Example 1, and FIG. 10 shows the result of the fitting process for the Raman spectrum of the positive electrode active material powders in Comparative Example 1.

TABLE 3

| | Peak intensity $I_D$ of D band | Peak intensity $I_G$ of G band | $I_D/I_G$ | Full width at half maximum of peak of G band |
|---|---|---|---|---|
| Example 1 | 816.58 | 965.91 | 0.85 | 76.59 |
| Example 2 | 856.25 | 984.28 | 0.87 | 77.21 |
| Comparative Example 1 | 464.90 | 436.26 | 1.07 | 87.18 |
| Comparative Example 2 | 656.98 | 644.19 | 1.02 | 97.78 |

Figure 9:
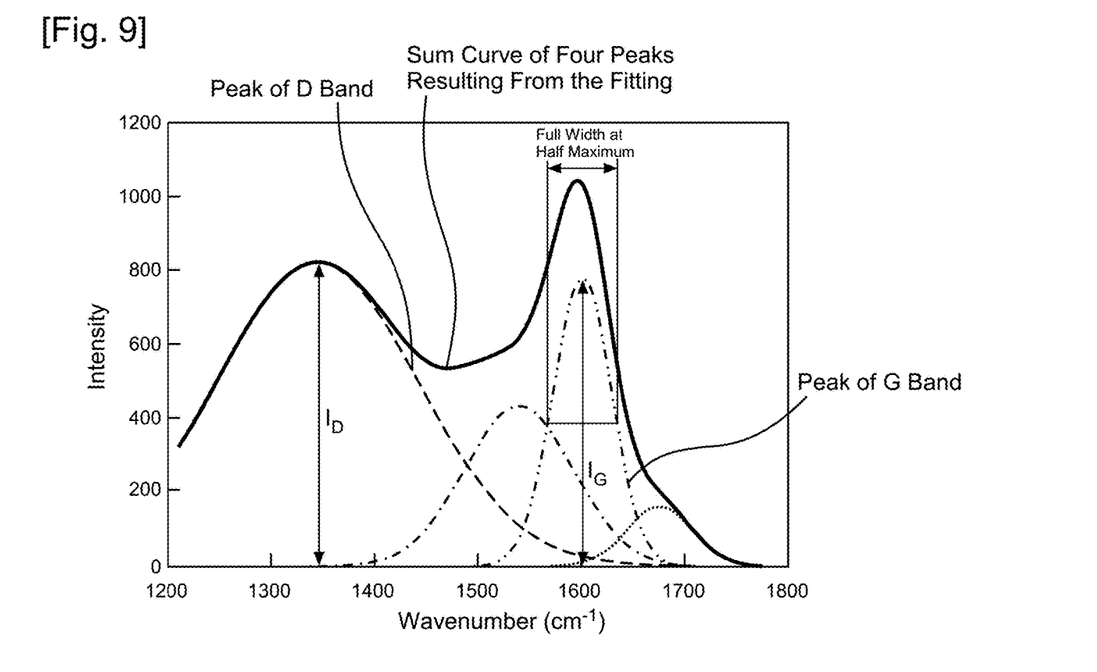
FIG. 9 is a graph showing a fitting result in a Raman spectrum for positive electrode active material powders according to Example 1.
Figure 10:
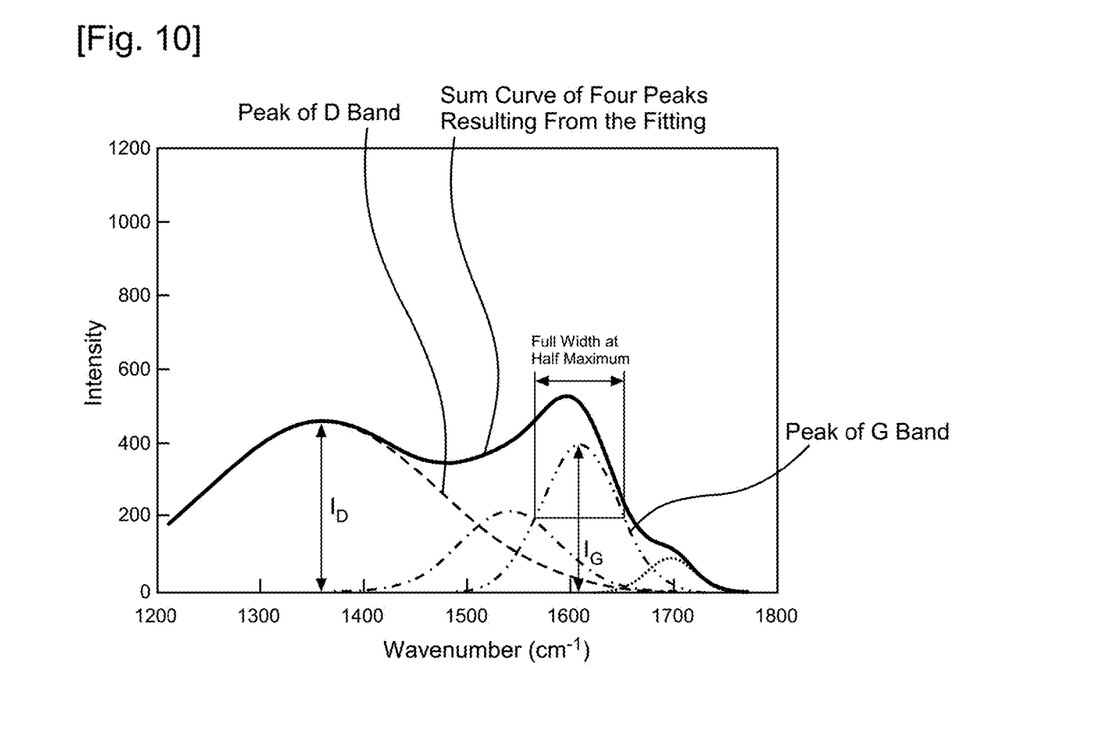
FIG. 10 is a graph showing a fitting result in a Raman spectrum for positive electrode active material powders according to Comparative Example 1.

As is apparent from the fitting results shown in FIGS. 9 and 10, a fitting process can be performed for the obtained Raman spectra by adding four peaks together.

The peak near around 1590 cm$^{-1}$ is the peak of the G band. This peak is commonly observed for sp$^2$ carbons (carbon atoms having three bonds) and corresponds to the C-C stretching vibration of a carbon hexagonal network plane. It is considered that, when the carbon hexagonal network planes 4 included in the carbonaceous coating film 8 are grown, the peak intensity $I_G$ of the G band increases. The full width at half maximum (FWHM) of the peak of the G band is considered to reflect the crystalline nature of the carbon hexagonal network plane. It is considered that, the smaller the full width at half maximum of the peak of the G band becomes, the higher the parallelism of the carbon hexagonal network planes becomes, which leads to an increase in the length of the carbon hexagonal network plane, and therefore, the structure of the carbonaceous coating film becomes close to a graphite structure.

The peak near about 1350 cm$^{-1}$ is the peak of the D band, and corresponds to a structural defect of the carbon hexagonal network plane. It is considered that, the more the edge portions of the carbon hexagonal network planes 4 included in the carbonaceous coating film 8 increase, the larger the peak intensity $I_D$ of the D band becomes.

The ratio $I_D/I_G$ is considered to reflect the ratio between the network planes of the carbon hexagonal network planes and the edges of the carbon hexagonal network planes. It is considered that the proportion of the network planes of the carbon hexagonal network planes 4 included in the carbonaceous coating film 8 is increased, as the ratio $I_D/I_G$ becomes smaller. Specifically, it is considered that the carbon hexagonal network planes 4 are grown and the size of the carbon hexagonal network planes 4 is increased, as the ratio $I_D/I_G$ becomes smaller.

Comparing the fitting results of Examples 1 and 2 and the fitting results of Comparative Examples 1 and 2 shown in Table 3, the ratio $I_D/I_G$ is 0.9 or lower in Examples 1 and 2, whereas the $I_D/I_G$ is 0.9 or higher in Comparative Examples 1 and 2. Therefore, it is considered that the carbon hexagonal network planes 4 included in the positive electrode active material powders in Examples 1 and 2 are more grown than the carbon hexagonal network planes 4 included in the positive electrode active material powders in Comparative Examples 1 and 2.

In addition, it is found that the full width at half maximum (FWHM) of the peak of the G band is 80 cm$^{-1}$ or smaller in Examples 1 and 2, whereas the full width at half maximum (FWHM) of the peak of the G band is 80 cm$^{-1}$ or larger in Comparative Examples 1 and 2. Therefore, the carbon hexagonal network planes 4 included in the positive electrode active material powders in Examples 1 and 2 have a higher parallelism and are more grown than the carbon hexagonal network planes 4 included in the positive electrode active material powders in Comparative Examples 1 and 2.

Accordingly, with the configuration in which the carbonaceous coating film 8 is formed so that a Raman spectrum, in which the ratio $I_D/I_G$ between the peak intensity $I_D$ of the D band and the peak intensity $I_G$ of the G band is 0.9 or lower and the full width at half maximum of the peak of the G band is 80 cm$^{-1}$ or smaller, is measured, the resistance of the carbonaceous coating film 8 can be increased when the battery is in an overcharged state.

TEM Observation

The carbonaceous coating film 8 included in the positive electrode active material powders in Example 1 was directly observed using a transmission electron microscope (EM-002B manufactured by Topcon Corporation). The carbonaceous coating film 8 included in the positive electrode active material powders in Comparative Example 1 was also directly observed. Note that a flaking process was not conducted.

FIG. 11(a) shows a TEM image of the positive electrode active material powders in Example 1, and FIG. 11(b) shows an enlarged image of a region C enclosed by a broken line in FIG. 11(a).

Figure 11:
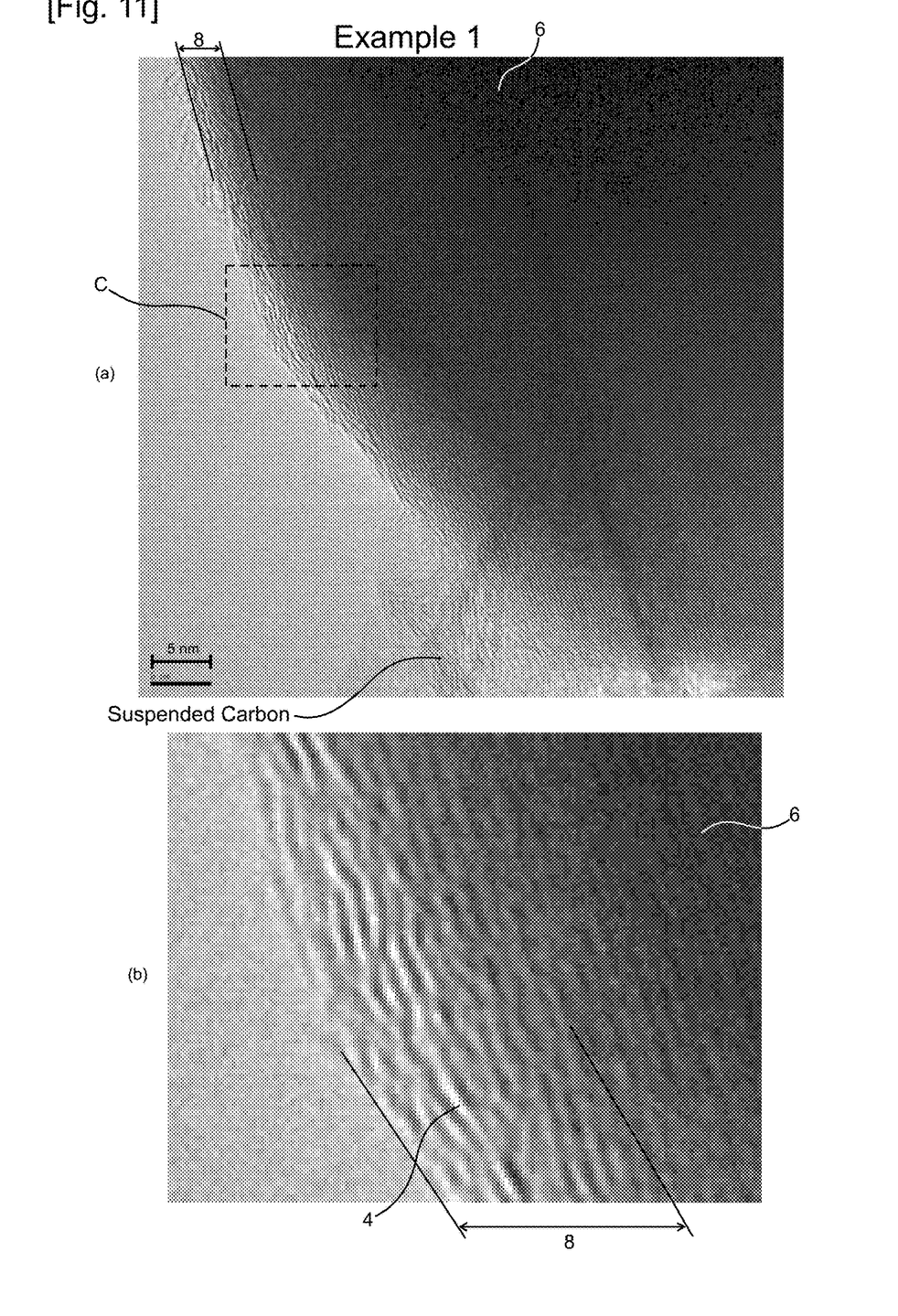

It is found from FIG. 11 that the thickness of the carbonaceous coating film 8 is about 4 nm. It is also found that the carbonaceous coating film 8 has a structure in which the carbon hexagonal network planes 4 arranged to face the surface of the positive electrode active material particles 6 lie over one another.

In addition, the average size of the carbon hexagonal network planes 4 is about 4.5 nm.

The carbonaceous coating film 8 included in the positive electrode active material powders in Example 2 was directly observed. Although not shown, the average size of the carbon hexagonal network planes 4 is about 3.2 nm.

FIG. 12(a) shows a TEM image of the positive electrode active material powders in Comparative Example 1, and FIG. 12(b) shows an enlarged image of a region D enclosed by a broken line in FIG. 12(a).

Figure 12:
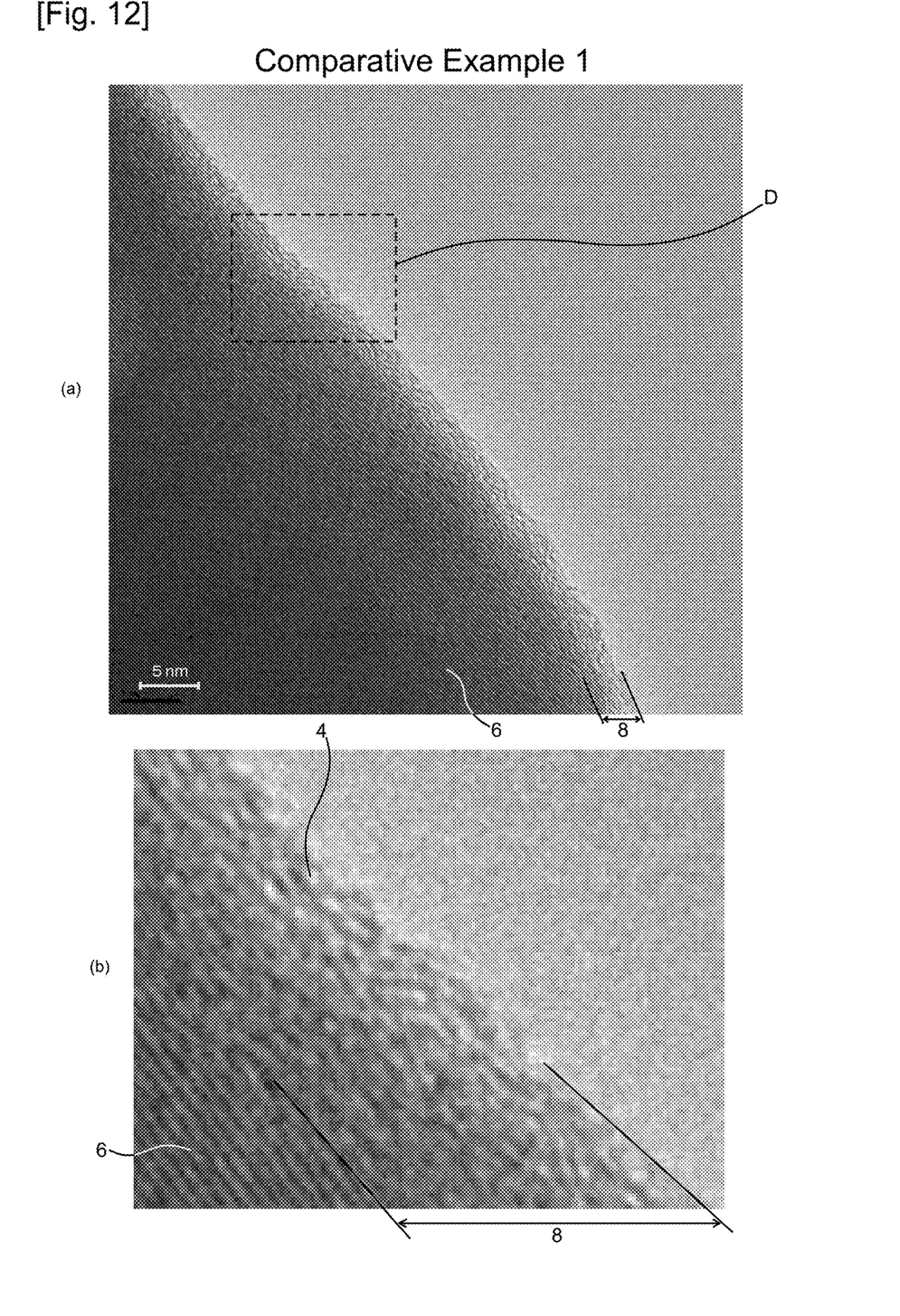

It is found from FIG. 12 that the carbonaceous coating film 8 has a complex structure of intricate small carbon hexagonal network planes 4.

In addition, the average size of the carbon hexagonal network planes 4 is about 1.5 nm.

The carbonaceous coating film 8 included in the positive electrode active material powders in Comparative Example 2 was directly observed. Although not shown, the average size of the carbon hexagonal network planes 4 is about 1.6 nm.

The result in which the average size of the carbon hexagonal network planes 4 in Examples is larger than that in Comparative Examples shows the tendency similar to the measurement results of Raman spectra.

In addition, it is considered that, due to the configuration in which the carbonaceous coating film 8 has a structure in which the carbon hexagonal network planes 4 arranged to face the surface of the positive electrode active material particles lie over one another so as to be parallel to one another to some extent, the resistance of the carbonaceous coating film 8 can be increased when the battery is in an overcharged state. Unless the carbon hexagonal network planes have a certain size, the structure in which the carbon hexagonal network planes 4 lie over one another so as to be parallel to one another to some extent cannot be formed, and thus, an irregular structure with a poor orientation may be formed.

In Example 1, the rise in the resistance of the positive electrode occurs earlier. The reason for this is considered that the conduction connection between the carbon hexagonal network planes 4 composing the carbonaceous coating film 8 is cut earlier. To cut the conduction connection earlier, it is considered to be desirable that the carbonaceous coating film 8 has less conduction connection between the carbon hexagonal network planes 4. Accordingly, it is considered to be desirable that the average size of the carbon hexagonal network planes 4 is 3 nm or larger.

When the carbonaceous coating film is formed in the positive electrode active material, the carbon precursor is subjected to a carbonizing process. If this process is conducted at 1000° C. or higher, the crystal structure of the positive electrode active material may collapse. It is considered to be difficult to set the average size of the carbon hexagonal network planes 4 of the carbonaceous coating film 8 including the positive electrode active material powders to be about 12 nm or larger in the light of the limitation in the temperature in the carbonizing process.

If the thickness of the carbonaceous coating film 8 is too large, the lithium ion conductivity with the positive electrode active material is deteriorated, and if it is too small, the electron conductivity is deteriorated. In view of this, the thickness of the carbonaceous coating film 8 is preferably set to be about 3 to 10 nm.

DESCRIPTION OF REFERENCE SIGNS

1 Positive electrode active material layer
2 Positive electrode active material
3 Positive electrode current collector
4 Carbon hexagonal network plane
5 Positive electrode
6 Positive electrode active material particle
7 Conductive auxiliary agent
8 Carbonaceous coating film
9 Pore
10 Battery case
11 Lid member
12 Positive electrode connection member
13 Negative electrode connection member
15 Non-aqueous electrolyte
16a, 16b Screw member
18a, 18b External connection terminal
20a, 20b External insulating member
21a, 21b Internal insulating member
22 Power generation element
25 Shrink film
30 Non-aqueous electrolyte secondary battery
32 Negative electrode
34 Separator
36 Negative electrode active material layer
38 Negative electrode current collector

The invention claimed is:

1. A positive electrode active material for a non-aqueous electrolyte secondary battery, comprising positive electrode active material particles, and a carbonaceous coating film formed on the surface of the positive electrode active material particle and including a plurality of carbon hexagonal network planes, wherein
   the carbonaceous coating film is formed so that a Raman spectrum, in which a ratio $I_D/I_G$ between a peak intensity $I_D$ of the D band and a peak intensity $I_G$ of the G band is 0.9 or lower and the full width at half maximum of the peak of the G band is 80 cm$^{-1}$ or smaller, is measured,
   the positive electrode active material particles are olivine-type compound particles or NASICON-type compound particles,
   the plurality of carbon hexagonal network planes is arranged such that network planes thereof face the surface of the positive electrode active material particle, and
   the carbonaceous coating film is provided such that the average length of the carbon hexagonal network planes included in a transmission electron microscope image of the carbonaceous coating film is 3 nm or more and 12 nm or less.

2. A positive electrode for a non-aqueous electrolyte secondary battery comprising a positive electrode active material layer including the positive electrode active material according to claim 1.

3. A non-aqueous electrolyte secondary battery comprising the positive electrode according to claim 2, a negative electrode, a separator sandwiched between the positive electrode and the negative electrode, a non-aqueous electrolyte, and a battery case which stores the positive electrode, the negative electrode, the separator, and the non-aqueous electrolyte.

* * * * *